Dec. 17, 1929.    A. G. COOLEY    1,739,949
PHOTOTELEGRAPHIC SYNCHRONIZATION
Filed May 22, 1928    2 Sheets-Sheet 1
*Fig. 1*
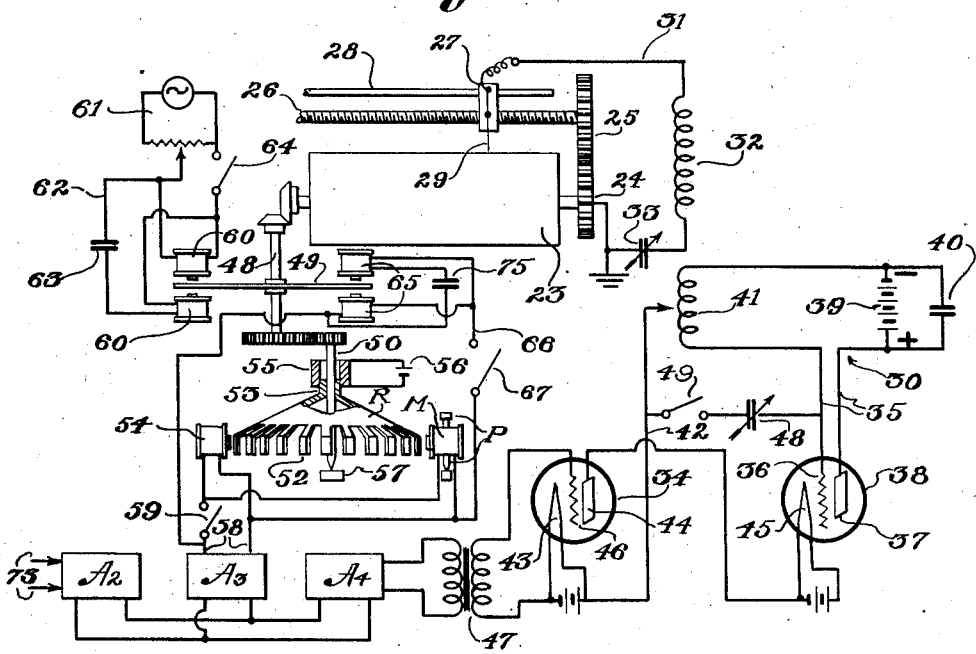
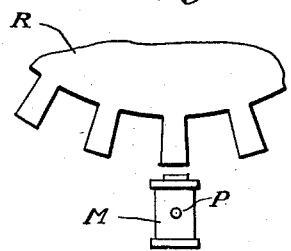
Synchronism
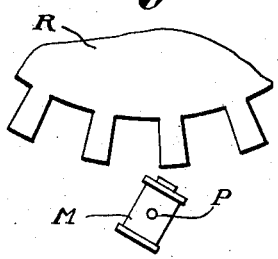
Leading
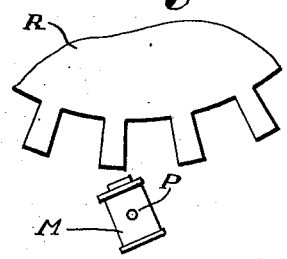
Lagging
Inventor
Austin G. Cooley
by Roberts Cushman & Woodbury
Att'ys.

Inventor:
Austin G. Cooley
by Roberts Cushman & Woodberry
Attys.

Patented Dec. 17, 1929

1,739,949

UNITED STATES PATENT OFFICE

AUSTIN G. COOLEY, OF NEW YORK, N. Y.

PHOTOTELEGRAPHIC SYNCHRONIZATION

Application filed May 22, 1928. Serial No. 279,673.

The present invention relates to means for maintaining synchronism with a pulsating electric current and more particularly to phototelegraphic apparatus in which the speed of the motor at the receiving station is controlled by impulses transmitted at a predetermined frequency from the transmitting station, as disclosed for example in my prior applications Serial No. 755,336, filed December 11, 1924, and Serial No. 257,929, filed February 29, 1928.

In one aspect the invention comprises a rotor having a plurality of salient poles, the conventional associated stator as used in phonic wheels being replaced preferably by a single pole consisting of an electromagnetic coil and core which is pivoted so as to rotate in the same plane as the rotor. This stator pole is supplied with electrical energy derived from the signal received from the phototelegraphic transmitter and its rotation of a small angle about its pivot, serves to indicate when the receiving apparatus is in synchronism with that of the transmitter and also to control means which maintain the synchronism.

In another aspect the invention comprises a rotor having a plurality of pole means moving in a circular path and magnetic means movable back and forth along said path together with a circuit for transmitting current impulses to one of said means at a substantially constant frequency, the pole means being distributed to pass the magnetic means substantially in time with the impulses, for example substantially at the moment of maximum amplitude, so that the magnetic attraction between the aforesaid means causes the movable magnetic means to move in the direction of rotation of the rotor when the speed of the rotor tends to increase and in the opposite direction when the speed tends to decrease. Preferably the pole means comprises unwound poles and the magnetic means a wound pole or electromagnet, thereby avoiding the necessity of using a commutator or slip rings as would be the case if the rotor poles were wound.

In a further aspect the invention involves driving or controlling the motor with current impulses bearing a predetermined ratio to the aforesaid impulses so that the rotor and electromagnet receive impulses in timed relation to each other. The ratio is preferably one to one so that the electromagnet receives an impulse for each impulse imparted to the rotor, in which case the rotor poles should be distributed so that one pole passes the electromagnet at each impulse.

In a still further aspect the invention involves driving a salient pole rotor by a variable speed motor which is also mechanically connected to the photographic recording apparatus, such as a rotating drum in this illustration. In most cases the drum is connected to the motor through a speed reduction gear. The synchronizing controlling impulses are supplied to the pivoted pole and bear a predetermined ratio to the speed of the rotor and the number of rotor poles that pass the electro-magnet, or stator pole. It is preferable that but one stator pole pass the rotor pole for each cycle or pulse.

For the purpose of illustration one concrete embodiment of the invention is shown in the accompanying drawings, in which:

Fig. 1 is a diagrammatic representation of phototelegraphic receiving apparatus;

Figs. 2, 3 and 4 are diagrams representing the position of the electromagnet when the rotor is in synchronism, leading and lagging respectively;

Figure 5:
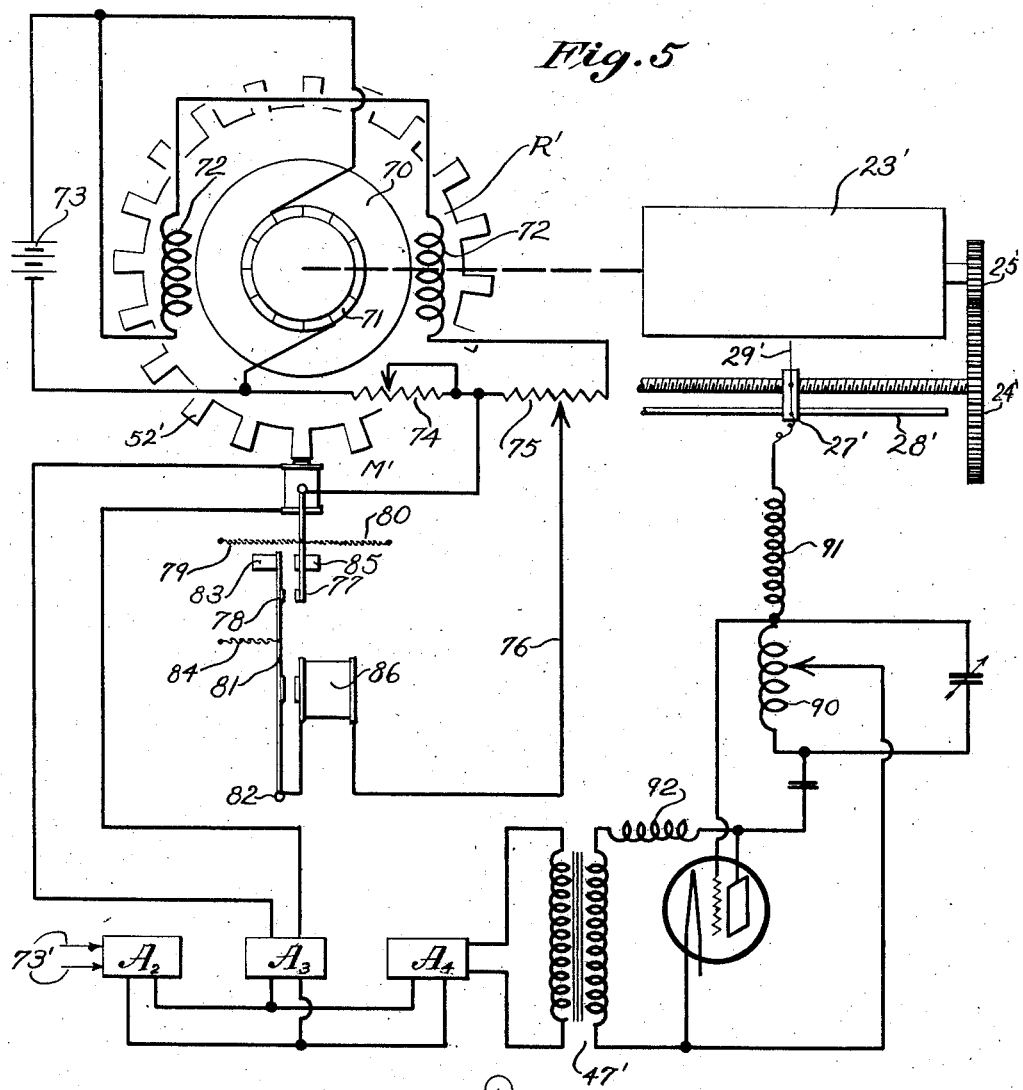
Fig. 5 is a diagram of a modified phototelegraphic embodiment.

The particular embodiments chosen for the purpose of illustration are shown as applied to apparatus such as disclosed in the aforesaid application and comprises a drum 23 which rotates without endwise progression, this drum carrying sensitized paper or other suitable recording media. Connected to the drum through gears 24 and 25 is a threaded shaft 26 along which travels a head 27, the head having an opening to receive stationary rod 28 which restrains the head from turning with the shaft. Head 27 carries a needle 29 for directing an electronic discharge to the sheet wound on drum 23.

In Fig. 1 the aforesaid discharge is produced by an oscillating circuit 30 feeding into circuit 31 containing coil 32 and condenser 33, the oscillating circuit being controlled by the aforesaid transmitting station working through amplifiers $A_2$ and $A_4$ and a modulator 34. The oscillator comprises a circuit 35 connected to the grid 36 and anode 37 of audion 38 and containing battery 39, condenser 40 and coil 41, the latter being inductively associated with coil 32. The circuit 42 from the cathode 43 and anode 44 of modulator 34 is connected between the coil 41 and cathode 45 of audion 38, the grid 46 of the modulator being connected to amplifier $A_4$ through transformer 47. A condenser 48 may be connected in the circuits by switch 49, but is ordinarily not required.

Geared to the drum 23 is a shaft 48 carrying a conducting disk 49 and geared to shaft 48 is a shaft 50 carrying a conical rotor R of paramagnetic material, the rotor having peripheral poles 52 and an axial stem 53 fast to shaft 50. Stationary coils 54 and 55 are associated with the poles 52 and stem 53 respectively, the coil 55 being energized by battery 56 to polarize poles 52 and also to pull upwardly on stem 53, thereby to cause the shaft 50 to rest lightly on bearing 57. The coils 54 are connected to amplifier $A_3$ through circuit 58 containing switch 59. Associated with disk 49 are electromagnets 60 connected to a variable source of alternating current 61 through circuit 62 containing condenser 63 to throw magnets 60 out of phase with each other and switch 64. The circuit 58 may also be connected to electromagnets associated with disk 49 and in the drawings this circuit is connected to electromagnets 65 other than magnets 60 through circuit 66 containing switch 67, a condenser 75 being connected in series with one of the electromagnets 65 to produce the necessary phase displacement.

The receiving drum 23 is driven at approximately the speed of the transmitting drum (not shown) by a source of alternating current 61 connecting, through 61, 62, 63, to the eddy-current motor comprising disk 49, the current in coils 60 being adjusted to such quantity and phase relation as to overcome the average resistance of the parts driven thereby, and the aforesaid impulses of current synchronize the drum 23 with the transmitting drum by recurrently energizing magnets 54 at the frequency of the transmitting current. The poles 52 are so distributed that one pole passes each magnet 54 during each impulse. If the motor 49 is driving the drum 23 at synchronous speed the alternate advancing and retarding effects of the magnets 54 cancel, whereas if motor 49 tends to drive drum 23 too slow or too fast either the advancing or the retarding effect of magnets 54 predominates to maintain the drum in synchronism.

By closing switch 67 power is supplied to motor 49 in proportion to the intensity of the transmitting impulses, and the power of the eddy-current motor is thereby varied in accordance with the current in magnets 54, thus more effectively holding the drum in synchronism during wide variations in the intensity of the transmitting impulses.

In Fig. 1 the aforesaid electromagnet M is connected in parallel with the magnets 54 which control the speed of the rotor, the magnet M being pivoted at P to oscillate back and forth tangentially of the rotor, that is either in the direction of rotation as shown in Fig. 3 or in the opposite direction as shown in Fig. 4. When the rotor R is in synchronism the magnet M receives an impulse when each rotor pole is opposite thereto and therefore remains substantially in mid position (Fig. 2). When the rotor is leading, that is tending to exceed its synchronous speed, the electromagnet swings into the position shown in Fig. 3 and, when lagging, into the position shown in Fig. 4, thereby indicating the tendency of the rotor so that the tendency may be corrected by adjusting the aforesaid eddy-current motor either manually or automatically through an interconnection between magnet M and the eddy-current motor control.

The modification shown in Fig. 5 is, in some respects, similar to that shown in Fig. 1 and corresponding parts are correspondingly designated. However, the oscillating circuit, the motor and the pivoted magnet are differently constructed and arranged as follows:

The corona discharge from needle 29′ is produced by an oscillating circuit whose primary inductance is coil 90 and secondary coil 91. The oscillator in this illustration is of a common vacuum tube type, the power for driving it being derived from the received phototelegraphic signals which are amplified by amplifiers $A_2$—$A_4$ and fed to the oscillator circuit through the transformer 47′ which is separated from the oscillating circuit by means of the choke coil 92.

The rotor R′, having salient poles 52′, and the drum 23′ are driven by a conventional shunt motor comprising an armature 70, commutator 71, field coils 72, and source of potential 73. Connected in series with the field coils are two variable resistances 74 and 75 to vary the speed of the rotor. A part of resistance 75 may be short circuited through circuit 76 and contacts 77 and 78. Contact 77 is carried by an arm fast to the pivoted magnet M′ (corresponding to M of Fig. 1), the parts normally being held in the neutral position shown in Fig. 5 by light springs 79 and 80. The contact 78 is mounted on armature 81 pivoted at 82. This armature is normally held against stop 83 by spring 84 and is moved to the right against stop 85 when the magnet 86 is energized.

The resistances 74 and 75 are adjusted so that the rotor slightly exceeds synchronous speed, whereupon the magnet M' rotates in a clockwise direction, as above described in connection with Figs. 1 to 4, thereby moving contact 77 against contact 78 to close circuit 76. This energizes magnet 86 which moves armature 81 from stop 83 to stop 85, thereby restoring magnet M' to neutral position. This closure also shunts enough of the resistance 85 to cause the rotor to slow down slightly below synchronous speed, whereupon magnet M' rotates counter-clockwise, thereby opening the shunt circuit at 77—78 to deenergize magnet 86 and restore resistance 75 to its full effective value. The cycle is then repeated, keeping the rotor R' from getting out of step with the transmitting impulses received over line 73'.

This system of synchronizing is advantageous in that the equipment is simple and that very little power is required to operate the pivoted stator coil. With proper adjustments of the stops 83 and 85 and the resistances 74 and 75, the rotor R' should not vary more than a quarter of a cycle from its proper position with respect to the transmitting equipment. That means that with average receiving equipment, the receiving drum will not advance or lag behind the transmitting drum more than one three-hundredth of an inch.

Figure 6:
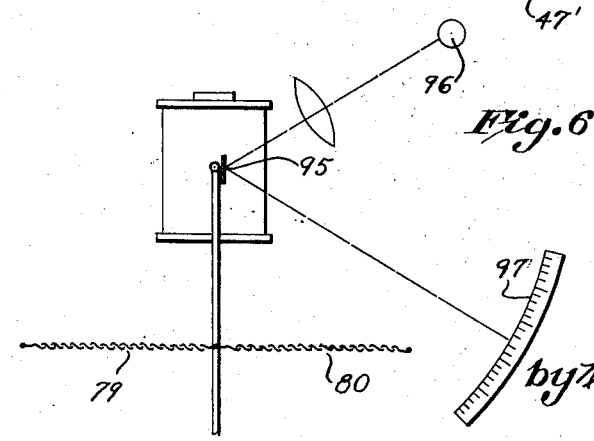
Fig. 6 is a detail view of the electromagnet with associated indicating means.

Either or both of the magnets M and M' may be provided with indicating means, such for example as a mirror 95 to reflect light from source 96 to a scale 97, as shown in Fig. 6. If the receiving system is not in synchronism, the pivoted coil M' will tend to vibrate. The rate of vibration will indicate the difference between the running speed and synchronous speed. When in synchronism, the beam will swing slowly up and down the scale as the motor tends to lead or lag in reference to synchronous speed. The springs 79 and 80 serve to steady the coil and keep it in its neutral position when not in operation.

I claim:

1. Phototelegraphic apparatus of the type having a transmitter and receiver moving in synchronism, comprising a motor having a rotor for driving the receiver, the rotor having one or more poles, an electromagnet movably mounted along the circular path of the poles to indicate leading and lagging tendencies, and a circuit for transmitting impulses to the electromagnet at a frequency bearing a predetermined ratio to the impulses from the transmitter, whereby the electromagnet is moved in the direction of rotation when the rotor tends to lead and in the opposite direction when the rotor tends to lag.

2. Phototelegraphic apparatus of the type having a transmitter and receiver moving in synchronism, comprising a rotor for driving the receiver, the rotor having pole means moving in a circular path, means for rotating said rotor at predetermined speed, a stator electromagnet mounted along said path to move back and forth to a limited extent tangentially of said path to indicate leading and lagging tendencies, and means for transmitting to said electromagnet current impulses so timed with respect to the transmitter impulses and to said pole means that the electromagnet moves in one direction when the rotor tends to lead and in the opposite direction when the rotor tends to lag.

3. Phototelegraphic apparatus comprising a motor having a rotor synchronized by impulses of predetermined frequency, the rotor having pole means, an electromagnet movably mounted along the circular path of the poles to indicate leading and lagging tendencies, and a circuit for transmitting impulses to the electromagnet at said frequency, whereby the electromagnet is moved in the direction of rotation when the rotor tends to lead and in the opposite direction when the rotor tends to lag.

4. Phototelegraphic apparatus comprising a rotor having a plurality of poles moving in a circular path, a stator electromagnet having limited back-and-forth movement along said path to indicate leading and lagging tendencies, and means for transmitting current impulses to said electromagnet, said poles being distributed to pass said electromagnet substantially in synchronism with said impulses, whereby the magnetic attraction between the electromagnet and poles causes the electromagnet to move in the direction of rotation when the rotor tends to lead and in the opposite direction when the rotor tends to lag.

5. Apparatus of the character described comprising a rotor having a plurality of pole means moving in a circular path, and magnetic means movable back-and-forth along said path to indicate leading and lagging tendencies, and a circuit for transmitting current impulses to one of said means at a substantially constant frequency, said poles being distributed to pass said magnetic means substantially in time with said impulses, whereby the magnetic attraction between said means causes the magnetic means to move in one direction when the speed of the rotor tends to increase and in the opposite direction when said speed tends to decrease.

6. Phototelegraphic apparatus of the type having a transmitter and receiver moving in synchronism, comprising a motor having a rotor for driving the receiver, the rotor having pole means, an electromagnet movably mounted along the circular path of the poles, and a circuit for transmitting impulses to the electromagnet at a frequency bearing a predetermined ratio to the impulses from the transmitter, whereby the electromagnet is moved in the direction of rotation when the rotor tends to lead and in the opposite direction when the rotor tends to lag, and means responsive to movement of said electromagnet to regulate the speed of the rotor.

7. Phototelegraphic apparatus of the type having a transmitter and receiver moving in synchronism, comprising a rotor for driving the receiver, the rotor having pole means moving in a circular path, means for rotating said rotor at predetermined speed, a stator electromagnet mounted along said path to move back and forth to a limited extent tangentially of said path, and means for transmitting to said electromagnet current impulses so timed with respect to the transmitter impulses and to said pole means that the electromagnet moves in one direction when the rotor tends to lead and in the opposite direction when the rotor tends to lag, and means responsive to movement of said electromagnet to regulate the speed of the rotor.

8. Phototelegraphic apparatus comprising a motor having a rotor synchronized by impulses of predetermined frequency, the rotor having pole means, an electromagnet movably mounted along the circular path of the pole means, and a circuit for transmitting impulses to the electromagnet at said frequency, whereby the electromagnet is moved in the direction of rotation when the rotor tends to lead and in the opposite direction when the rotor tends to lag, and means responsive to movement of said electromagnet to regulate the speed of the rotor.

9. Phototelegraphic apparatus comprising a rotor having a plurality of poles moving in a circular path, a stator electromagnet having limited back-and-forth movement along said path, and means for transmitting current impulses to said electromagnet, said poles being distributed to pass said electromagnet substantially in synchronism with said impulses, whereby the magnetic attraction between the electromagnet and poles causes the electromagnet to move in the direction of rotation when the rotor tends to lead and in the opposite direction when the rotor tends to lag, and means responsive to movement of said electromagnet to regulate the speed of the rotor.

10. Apparatus of the character described comprising a rotor having a plurality of pole means moving in a circular path, and magnetic means movable back-and-forth along said path, and a circuit for transmitting current impulses to one of said means at a substantially constant frequency, said poles being distributed to pass said magnetic means substantially in time with said impulses, whereby the magnetic attraction between said means causes the magnetic means to move in one direction when the speed of the rotor tends to increase and in the opposite direction when said speed tends to decrease, and means responsive to movement of said electromagnet to regulate the speed of the rotor.

11. Phototelegraphic apparatus of the type having a transmitter and receiver moving in synchronism, comprising a motor having a rotor for driving the receiver, the rotor having poles, an electromagnet movably mounted along the circular path of the poles, a circuit for transmitting impulses to the electromagnet at a frequency bearing a predetermined ratio to the impulses from the transmitter, whereby the electromagnet is moved in the direction of rotation when the rotor tends to lead and in the opposite direction when the rotor tends to lag, and means associated with said electromagnet for indicating the leading or lagging tendency of the rotor.

12. Phototelegraphic apparatus comprising a motor having a rotor synchronized by impulses of predetermined frequency, the rotor having poles, an electromagnet movably mounted along the circular path of the poles, a circuit for transmitting impulses to the electromagnet at said frequency, whereby the electromagnet is moved in the direction of rotation when the rotor tends to lead and in the opposite direction when the rotor tends to lag, and means associated with said electromagnet for indicating the leading or lagging tendency of the rotor.

13. Phototelegraphic apparatus comprising a motor having a rotor synchronized by impulses of predetermined frequency, the rotor having pole means, an electromagnet movably mounted along the circular path of the pole means, and a circuit for transmitting impulses to the electromagnet at said frequency, whereby the electromagnet is moved in the direction of rotation when the rotor tends to lead and in the opposite direction when the rotor tends to lag, and means responsive to movement of said electromagnet to indicate tendency to lead or lag.

Signed by me at New York, New York, this eighteenth day of May, 1928.

AUSTIN G. COOLEY.